United States Patent [19]

Tantawi

[11] Patent Number: 4,560,287

[45] Date of Patent: Dec. 24, 1985

[54] SAFETY CASE FOR THE MEDICAL GLASS THERMOMETER

[76] Inventor: Ahmed M. Tantawi, P.O. Box 2031, Cairo, Egypt

[21] Appl. No.: 608,916

[22] Filed: May 10, 1984

Related U.S. Application Data

[63] Continuation of Ser. No. 365,413, Apr. 5, 1982, abandoned.

[51] Int. Cl.$^4$ ............................................. G01K 1/08
[52] U.S. Cl. .................................................. 374/194
[58] Field of Search ............... 374/158, 165, 193, 194; 200/306

[56] References Cited

U.S. PATENT DOCUMENTS

| | | | |
|---|---|---|---|
| 2,052,479 | 8/1936 | Loggins | 206/306 |
| 3,490,287 | 1/1970 | Coben | 374/194 |
| 3,592,059 | 7/1971 | Chilton | 374/165 |
| 3,809,229 | 5/1974 | Wahlig | 374/194 |

FOREIGN PATENT DOCUMENTS 684161  3/1965  Italy ..................................... 374/193

Primary Examiner—Charles Frankfort
Assistant Examiner—Denis E. Corr
Attorney, Agent, or Firm—Townsend and Townsend

[57] ABSTRACT

A protective case for a conventional capillary fever thermometer which includes at the bulb end of the capillary fever thermometer a rigid cap which is partially spaced from the bulb. A transparent securing portion enclosing the graduated part of the capillary stem of the thermometer. The rigid cap and the securing portion held together by a recess in the securing portion receiving a protrusion on the cap. Also connecting the cap and securing portion is thermoplastic material of the securing portion in radial apertures in the side wall of the cap.

3 Claims, 6 Drawing Figures

SAFETY CASE FOR THE MEDICAL GLASS THERMOMETER

This is a continuation of application Ser. No. 365,413, filed Apr. 5, 1982 and now abandoned.

BACKGROUND OF THE INVENTION

Measuring the human body's temperature has always been a world-wide necessity for medical doctors, nurses, and almost every male or female adult. It has also been of equal importance that patient's temperatures are taken, as advised by medical doctors, with exact adherence to regular and appointed times.

Common glass thermometers, now in use, have been known for many years to be the only as well as the best available instruments to fulfill the afore-mentioned needs. However, the use of these thermometers is usually associated with worry and fear, mainly from glass breakage in either the mouth or rectum. Such an incident exposes the patient to serious internal or external cuts, and to fatal poisoning with mercury. This twofold danger is particularly liable to take place, with millions of sick infants, young children and adults of all ages who may suffer from full or partial unconsciousness, nervousness, or from their inability to control their movements.

As a result of this justified fear from glass theremometer breakage and its serious outcomings, many parents either postpone or discontinue taking the temperatures of their beloved sick children. Consequently, they deprive them of an indispensable aid for their quick recovery, and in certain cases, for their survival. Even professional nurses, in some hospitals of the developing countries, fail to keep adequate temperature records of their attended young as well as grown-up patients, simply because of the nurses' fear of breaking the thermometers.

In fact, several efforts were made in order to find out a safer substitute for the hazardous, commonly used glass thermometer. Inventing the American-Italian "Fever test" tape is a good example. However, this tape proved to be only a fever indicator, but not an accurate full scale theremometer. Electronic as well as digital innovated thermometers which have been recently introduced and are available on the market, have not solved the problem either. They are beyond the means of the vast majority of individual citizens, common hospital budgets, and the developing countries in general. Hence, the difficulties encountered with the regular medical glass thermometer of the present invention are not yet overcome. The "safety case for the medical glass thermometer" may well solve such needless problems. Furthermore, this invention will make it possible for the common individual to obtain a cheap and most appropriate thermometer for infants, young children and all sick adult cases. Its use is definitely safe against breakage while being in the mouth, rectum or armpit. It also helps us avoid the unnecessary trouble caused by broken glass particles, whether in the patient's bed or on the room floor.

Such multi-safe characteristics of this newly developed thermometer are expected to provide all users with a precious feeling of confidence and encourage them to be more punctual in temperature taking. Consequently, temperature taking will neither be postponed nor dropped.

However, it is worth mentioning that this invention does not just imply the simple application of a metal cap to shield the highly breakable head-part of the regular glass thermometer. Experimentation with a good number of tightly fitted caps did not give satisfying results. Only with the use of a highly thermal conductive, semi-liquid compound, does the encased thermometer became efficient and reliable. Moreover, this invention, in its present stage, is as easy to use, as sensitive to the body's warmth, and as accurate as the commonly known breakable glass thermometer.

SUMMARY OF THE INVENTION

The basis of this invention is the application of a hard break-resisting "case" to the regular medical glass thermometer, in order to prevent its accidental breaking while being used inside the delicate tissues of the patient's mouth, rectum or armpit. Consequently, the patient is offered a valuable and guaranteed safety against the three major risks of thermometer breakage; serious internal glass cut, painful external wounds, and mercury poisoning which may even be fatal. Hence, this newly developed "case" may be considered an absolute "safety" device.

The cavity of this "case" is designed to enclose the whole bulk of the selected glass thermometer. The exterior shape of this "case" resembles that of an ordinary glass thermometer, but only slightly bigger.

Whether this case is to be assembled of one or more than one part, the thermometer is permanently incorporated, and tightly sealed within the surrounding case walls. These walls then act as a protective shield for the thermometer glass against probable pressure, bending, twisting or any other form of strain, which may result from the patient's violence or accidental movements.

While designing this "safety case", it has been taken into consideration that the incased glass thermometer will continue to sense and react properly and accurately to the warmth of the tissues touching the outer surface of the metal head-part of the case. Through the transparent plastic part of the case, the thermometer scale as well as its changing mercury column can be easily seen.

Accordingly, this invention fulfills its main purpose, i.e. preventing the regular glass thermometer, while in use, from being broken inside the patient's mouth, rectum, or armpit, without either hindering or interrupting the thermometer's measuring capacity. Nevertheless, this safety "case" does not make the use of the common thermometer any more difficult, nor does it raise its price beyond the means of the vast majority of the masses anywhere in the world.

BRIEF DESCRIPTION OF THE DRAWINGS

FIGS. 1-6 are views of three alternative designs, each of which is complete by itself and constructed in full accordance with the present invention.

DESCRIPTION OF THE PREFERRED EMBODIMENTS

Figure 1:
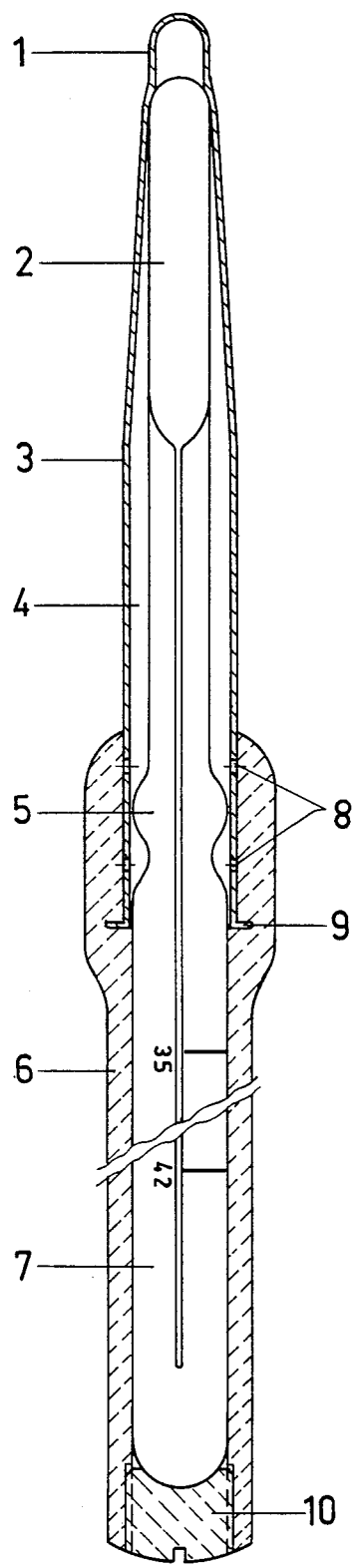
FIG. 1 is a longitudinal section view of a regular medical glass thermometer, enclosed in a single-piece "safety case".
Figure 2:
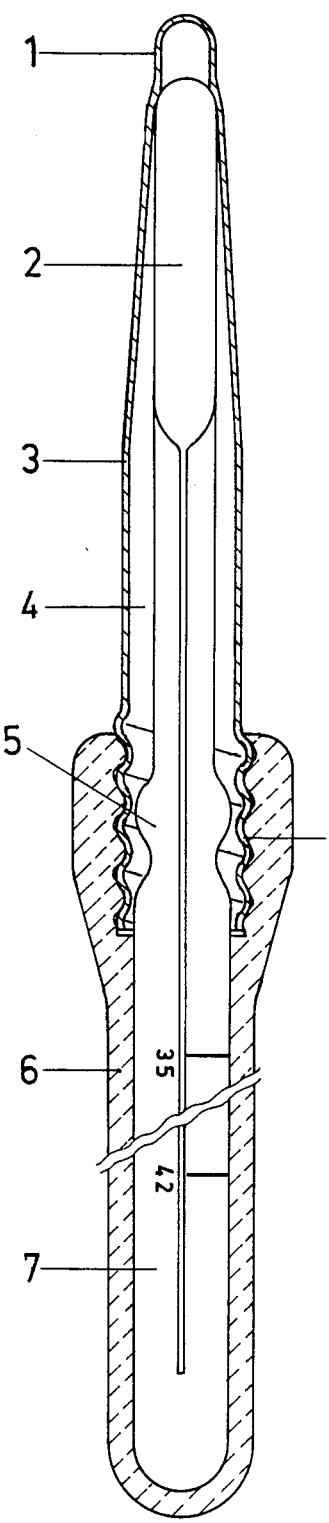
FIGS. 2 and 3 are two longitudinal section views of the same type of regular thermometers, but enclosed in two other different designs of the invented safety "case". Each of these "cases" is assembled of two separately manufactured parts, around the glass thermometer.
Figure 3:
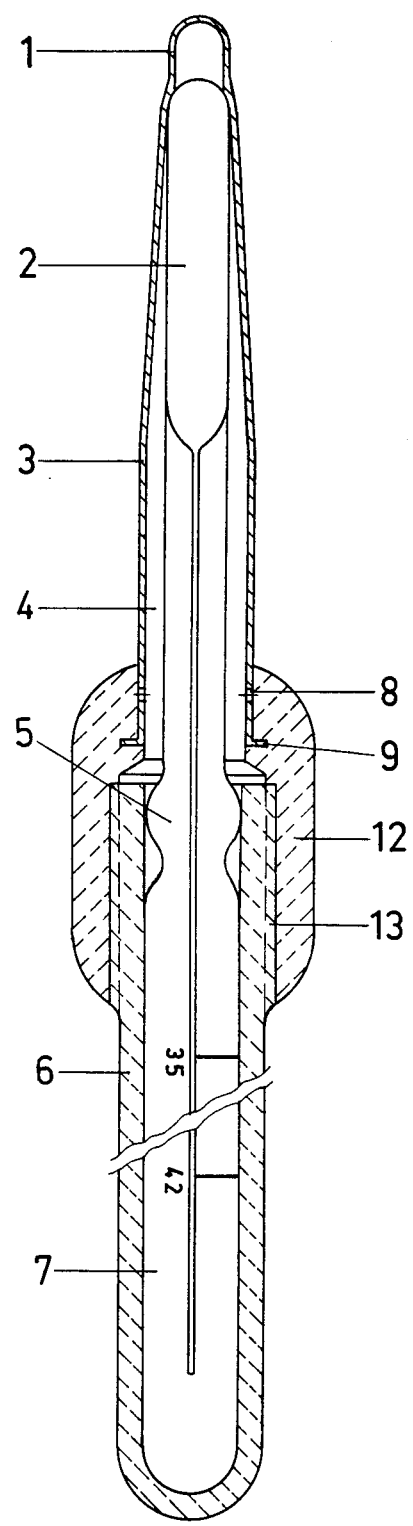
Figure 4:
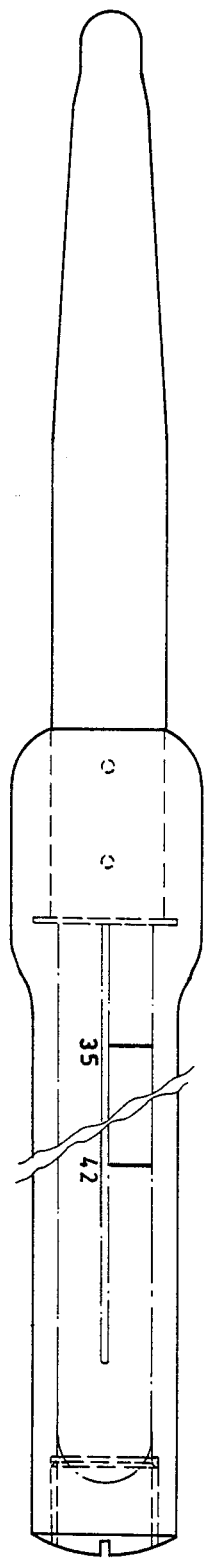
FIGS. 4, 5 and 6 show the general exterior views of the same safety case designs shown in FIGS. 1, 2 and 3.
Figure 5:
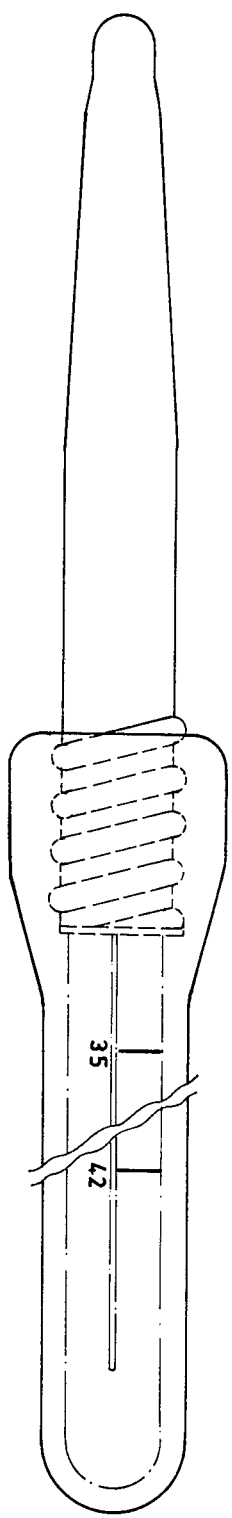
Figure 6:
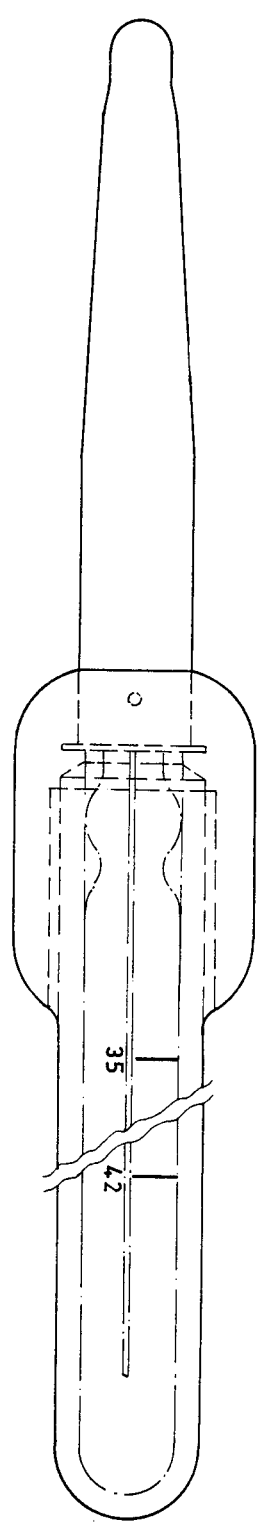

The six figures shown on the two attached drawings sheets, illustrate three alternatives for the preferred embodiments of this invention. FIGS. 1-3 are longitudinal sections of these alternatives, and FIGS. 4-6 are the general exterior views of the same "safety cases". All these drawings are about four times the actual size of the intended "cases".

FIG. 1 is a section view of the first design for the preferred embodiments of this invention. The whole medical glass thermometer here is finally encased. Its head-part, i.e. the mecury reservoir 2, is fitted inside the cap 3, which is made of any good heat conductive hard metal, such as aluminium, silver, and chromium plated copper. For the patient's convenience, the tip 1 of this cap is designed to be of an outer diameter equal to that of the glass mercury reservoir. The diameter of this same metal cap 2 increases gradually downwards along its middle upper part. It then becomes cylindrical till its lowest open end, in order to avoid unnecessary excessive thickness, and to fit around the neck-part 5 of the glass thermometer.

At about the last millimeter, before the lowest edge of the cap, the metal is sharply turned sidewise 9. Around the neck-part 5 of the thermometer, the metal wall of the cap is bored through in several places 8.

For manufacturing this case, the metal cap 3 should be prepared first. During the next step, the plastic tubular piece 6 is casted, by injection, around the lowest part of the metal cap. The suitable kind of plastic for this piece must be clear tranparent, hard, and break-resisting thermoplastic, such as methyl methacrelate. These properties are all necessary to make this part 6 of the case protective to the thermometer glass-body, and to show clearly the underneath readings of the incased thermometer.

Due to the sidewise turned edge 9 and the perforations 8 in the metal cap, the injected melted plastic will tightly fasten the plastic tube 6 together with the metal cap 3. These two main constituents then become a one-piece safety "case" for the chosen glass thermometer. Before inserting the thermometer into this already prepared "case", the inner surface of the upper parts 1 and 3 of the metal cap should be coated with a suitable semi-liquid compound, of high thermal conductivity, such as zinc oxide filled silicone compounds which are now used to assure good contact of the semiconductors to their heat sinks. The purpose of this coating is to get rid of the bad heat conductive air pockets and replace them with the good heat conductive compound, between the mercury reservoir 2 of the encased thermometer and the inner surface of the metal cap 3. Transmission of heat, from the patient's body through the metal cap 3, then via the thermal compound 4, and finally to the mercury reservoir 2, is thus fulfilled at its best.

After the "case", in FIG. 1, is properly charged with the glass thermometer, a small plastic stopper 10 is screwed in at the lowest end of tube 6. Using a methyl methacrelate plastic adhesive such as methyl methacrelate-chloroform cement, together with the tube stopper screws, will be adequate means for preventing the incased glass thermometer from rattling, vibrating or loosening. Furthermore, the whole inner cavity of the "case" is thus sealed off from outside undesirable matter such as dust, moisture and dirt.

FIG. 2 is a section view of a second design in accordance with this invention. The "case" here is made of two main preprepared pieces; the metal cap 3, and the plastic tube 6 which is closed at its lowest end. The former piece is similar to that of cap 3 in FIG. 1, except that it is here externally screwed 11, for about eight millimeters above its lowest open end. The plastic tube 6 surrounds the bulk of the thermometer body-part 7, and is internally screwed 11, for about eight millimeters below its upper open end. Both of these metal and plastic screwed ends 11, are designed to fit in each other precisely and tightly.

The suitable kinds of metal for cap 3 and plastic for tube 6, are here exactly like those already defined for parts 3 and 6 in the previous case design of FIG. 1.

Before the final assembling of this "case" of FIG. 2, the inner surface of the upper parts 1 and 3 of the metal cap should be coated with the same semi-liquid thermal conductive compound, described for the similar cap parts 1 and 3 in FIG. 1.

The metal cap 3 together with the plastic tube 6 are then finally assembled around the chosen regular glass thermometer and screwed in each other. Applying a suitable metal-plastic adhesive, such as epoxy, beside the already mentioned male-female screwing, must assure adequate firm attachment for the two main parts of this "case".

FIG. 3 is a section view of the third and last design here for the preferred embodiments of this invention. This "case" combines some features from both of the previously given designs of FIGS. 1 and 2.

It is a two-piece "case", like that of FIG. 2. The metal cap 3 is exactly like that of FIG. 1, but only slightly shorter. The plastic tube 6, which shields the whole scaled body-part of the glass thermometer, resembles that in FIG. 2. The two main parts of this "case" are also to be finally assembled and fastened tightly together with the aid of a suitable adhesive, such as methyl methacrelate-chloroform cement, and the male-female screwed sides 13. This design of FIG. 3, differs from the other designs of FIGS. 1 and 2, in two distinct features. The metal cap 3 is here given a plastic horn-like extension 12, internally screwed 13, and attached to the lowest end of the metal cap 3 with the turned out edge 9 as well as the several holes 8, like those of case design FIG. 1. The inner surface of the upper parts 1 and 3 of the metal cap, here, is to be coated with the same good thermal conductive compound previously described for both designs in FIGS. 1 and 2.

On the second drawing sheet 2 of 2, the three drawings FIGS. 4-6 successively illustrate the general exterior views of the alternative "case" designs sectioned in FIGS. 1-3 on sheet 1 of 2. All the metal caps 3 are streamlined, smooth, and slender enough for convenient mouth, rectum, and armpit use.

All of the plastic tubes 6 are highly transparent, to show the underneath thermometer readings fully and clearly. The general features of each of the three alternative designs in FIGS. 4-6, especially the thinner head-part and the slightly thicker body-part, are almost like those of the commonly used glass thermometer.

Consequently, no reasonable difficulties should be expected to prevent this simple as well as cheap, invented safety thermometer "case" from general acceptance and wide human usefulness.

I claim:

1. A protective case for a conventional fever thermometer having a bulb holding a heat expandable medium and having an exterior surface adapted to be placed in contact with tissue the temperature of which is to be measured, and a main thermometer body contiguous with the bulb and including means for displaying the measured tissue temperature, the protective case comprising an elongated, substantially rigid cap dimensioned to be placed over the bulb so that substantially the entire bulb is disposed within the cap, the cap being constructed so that an interior surface thereof is spaced apart from the bulb, the cap including an open end facing towards the main thermometer body, a generally radially outwardly extending protrusion and a plurality of apertures; securing means extending from the cap towards the main thermometer body and permitting the viewing of the temperature displaying means, the securing means including a first, open end facing the cap, a recess receiving the protrusion on the cap and a thermoplastic material molded over a portion of the cap proximate the open end so that the thermoplastic material extends into the apertures to permanently secure the cap to the securing means; and a flowable substance disposed within the cap for filling a space between the bulb and the interior cap surface when the cap is placed over the bulb, the substance having a sufficient heat conductivity so that the temperature sensed by the bulb substantially equals the temperature of a tissue after the cap is brought into contact with the tissue.

2. A protective case according to claim 1 wherein the cap is constructed of metal.

3. A protective case according to claim 1 wherein the substance comprises a zinc oxide filled silicone compound.

* * * * *